(12) United States Patent
Kas et al.

(10) Patent No.: US 11,261,542 B2
(45) Date of Patent: Mar. 1, 2022

(54) STABLE CATALYST INK FORMULATIONS, METHODS OF USING SUCH INKS IN FIBER FORMATION, AND ARTICLES COMPRISING SUCH FIBERS

(71) Applicant: Merck Patent GmbH, Darmstadt (DE)

(72) Inventors: Onur Kas, Waltham, MA (US); Ashley Moore, Darmstadt (DE); Ryan Sylvia, Tewksbury, MA (US); Gabriel Tkacik, Bedford, MA (US)

(73) Assignee: Merck Patent GmbH, Darmstadt (DE)

( * ) Notice: Subject to any disclaimer, the term of this patent is extended or adjusted under 35 U.S.C. 154(b) by 1082 days.

(21) Appl. No.: 15/120,233

(22) PCT Filed: Jan. 19, 2015

(86) PCT No.: PCT/EP2015/000086
§ 371 (c)(1),
(2) Date: Aug. 19, 2016

(87) PCT Pub. No.: WO2015/124250
PCT Pub. Date: Aug. 27, 2015

(65) Prior Publication Data
US 2017/0069915 A1     Mar. 9, 2017

Related U.S. Application Data

(60) Provisional application No. 61/989,724, filed on May 7, 2014, provisional application No. 61/988,514, filed (Continued)

(51) Int. Cl.
*H01M 4/86*      (2006.01)
*D01D 5/00*      (2006.01)
(Continued)

(52) U.S. Cl.
CPC .............. *D01D 5/003* (2013.01); *C09D 11/03* (2013.01); *C09D 11/10* (2013.01); *C09D 11/106* (2013.01);
(Continued)

(58) Field of Classification Search
None
See application file for complete search history.

(56) References Cited

U.S. PATENT DOCUMENTS 7,585,437 B2    9/2009   Jirsak et al.
8,124,260 B2    2/2012   Sayre
(Continued)

FOREIGN PATENT DOCUMENTS

CN    102054990 A    5/2011
EP    2642569 A1     9/2013
(Continued)

OTHER PUBLICATIONS

Kidai et al. (JP 2000353528 A, machine translation). (Year: 2000).*
(Continued)

*Primary Examiner* — Wojciech Haske
(74) *Attorney, Agent, or Firm* — Millen White Zelano and Branigan, PC; Csaba Henter

(57) ABSTRACT

The present invention relates to stable catalyst ink formulations comprising am electrospinning polymer selected from halogen-comprising polymers. The present invention further relates to electrospinning of such ink formulation, to the so-obtained electrospun fibrous mat as well as to articles comprising such electrospun fibrous mat.

19 Claims, 5 Drawing Sheets

Related U.S. Application Data on May 5, 2014, provisional application No. 61/942,497, filed on Feb. 20, 2014.

(51) Int. Cl.

| | | |
|---|---|---|
| *C09D 11/10* | (2014.01) | |
| *C09D 11/52* | (2014.01) | |
| *D04H 1/728* | (2012.01) | |
| *D01F 1/10* | (2006.01) | |
| *H01M 4/88* | (2006.01) | |
| *H01M 4/90* | (2006.01) | |
| *C09D 11/03* | (2014.01) | |
| *C09D 11/106* | (2014.01) | |
| *D01F 6/26* | (2006.01) | |
| *D04H 1/4318* | (2012.01) | |
| *H01M 4/92* | (2006.01) | |
| *D01F 6/16* | (2006.01) | |
| *H01M 8/1004* | (2016.01) | |
| *H01M 8/1018* | (2016.01) | |
| *H01M 8/10* | (2016.01) | |

(52) U.S. Cl.

CPC ............ *C09D 11/52* (2013.01); *D01D 5/0069* (2013.01); *D01F 1/10* (2013.01); *D01F 6/16* (2013.01); *D01F 6/26* (2013.01); *D04H 1/4318* (2013.01); *D04H 1/728* (2013.01); *H01M 4/8605* (2013.01); *H01M 4/8663* (2013.01); *H01M 4/8668* (2013.01); *H01M 4/881* (2013.01); *H01M 4/8825* (2013.01); *H01M 4/8853* (2013.01); *H01M 4/9041* (2013.01); *H01M 4/9075* (2013.01); *H01M 4/9083* (2013.01); *H01M 4/926* (2013.01); *H01M 8/1004* (2013.01); *H01M 8/1018* (2013.01); *H01M 2008/1095* (2013.01)

(56) References Cited

U.S. PATENT DOCUMENTS

| | | | |
|---|---|---|---|
| 8,665,810 B2 | 3/2014 | Wu | |
| 8,784,542 B2 | 7/2014 | Dullaert | |
| 2002/0019308 A1 | 2/2002 | Hitomi et al. | |
| 2003/0207167 A1 | 11/2003 | Prakash et al. | |
| 2006/0290031 A1 | 12/2006 | Jirsak et al. | |
| 2007/0265426 A1* | 11/2007 | Allcock | B01D 67/0009 |
| | | | 528/398 |
| 2008/0307766 A1 | 12/2008 | Petras et al. | |
| 2009/0155658 A1 | 6/2009 | Kotera | |
| 2013/0209913 A1 | 8/2013 | Pintauro et al. | |
| 2013/0273455 A1 | 10/2013 | Mori et al. | |
| 2014/0242477 A1* | 8/2014 | Kikuzumi | D04H 1/4318 |
| | | | 429/409 |
| 2014/0349213 A1* | 11/2014 | Pintauro | H01M 8/1044 |
| | | | 429/492 |

FOREIGN PATENT DOCUMENTS

| | | |
|---|---|---|
| JP | 2000-353528 A | 12/2000 |
| JP | 2004247152 A | 9/2004 |
| JP | 2004327358 A | 11/2004 |
| JP | 2007012325 A | 1/2007 |
| JP | 2007505224 A | 3/2007 |
| JP | 2008521174 A | 6/2008 |
| JP | 2008542571 A | 11/2008 |
| JP | 2011259431 A | 12/2011 |
| JP | 2012533006 A | 12/2012 |
| JP | 2013127865 A | 6/2013 |
| WO | 00/45448 A2 | 8/2000 |
| WO | 2005/024101 A1 | 3/2005 |
| WO | 2006/131081 A1 | 12/2006 |
| WO | 2008032597 A1 | 3/2008 |
| WO | 2008/106903 A2 | 9/2008 |
| WO | 2009075357 A1 | 6/2009 |
| WO | 2012/058425 A2 | 5/2012 |
| WO | WO-2013051189 A1 * | 4/2013 ........... D04H 1/4318 |

OTHER PUBLICATIONS

Office Action in corresponding Japan Appln. No. 2016-553308 dispatched Aug. 23, 2018. (pp. 1-4).

International Search Report dated Mar. 20, 2015 issued in corresponding PCT/EP2015/000086 application (4 pages).

Written Opinion of the International Searching Authority dated Mar. 20, 2015 issued in corresponding PCT/EP2015/000086 application (5 pages).

English Abstract of JP 2000-353528 A published Dec. 19, 2000.

M. Hess et al., "Terminology of Polymers Containing Ionizable or Ionic Groups and of Polymers Containing Ions", Pure Appl. Chem., vol. 78, No. 11 (2006) pp. 2067-2074.

T. Mallat et al., "Liquid-Phase Oxidation of 1-Methoxy-2-Propanol with Air III: Chemical Deactivation and Oxygen Poisoning of Platinum Catalysts", Applied Catalysis A: General, vol. 86, Issue 2 (1992) pp. 147-163.

M. Nagal et al., "Oxidation of Ethanol and Acetaldehyde on Silica-Supported Platinum Catalysts: Preparative and Pretreatment Effects on Catalyst Selectivity", Ind. Eng. Chem. Prod. Res. Dev., vol. 24 (1985) pp. 525-531.

C. Donze et al., "Aerobic Selective Oxidation of (Hetero) Aromatic Primary Alcohols to Aldehydes or Carboxylic Acids Over Carbon Supported Platinum", Applied Catalysis B: Environmental, vol. 70 (2007) pp. 621-629.

S.W. Choi et al., "Nation-Impregnated Electrospun Polyvinylidene Fluoride Composite Membranes for Direct Methanol Fuel Cells", Journal of Power Sources, vol. 180 (2008) pp. 167-171.

I. Shabani et al., "Nanofiber-Based Polyelectrolytes as Novel Membranes for Fuel Cell Applications", Journal of Membrane Science, vol. 368 (2011) pp. 233-240.

H.S. Thiam et al., "Nafion/Pd—SiO2 Nanofiber Composite Membranes for Direct Methanol Fuel Cell Applications", International Journal of Hydrogen Energy, vol. 38, No. 22 (2013) pp. 9474-9483.

Z. Dong et al., "Electrospinning Materials for Energy-Related Applications and Devices", Journal of Power Sources, vol. 196 (2011) pp. 4886-4904.

S. Cavaliere et al., "Electrospinning: Designed Architectures for Energy Conversion and Storage Devices", Energy & Environmental Science, vol. 4 (2011) pp. 4761-4785.

* cited by examiner

STABLE CATALYST INK FORMULATIONS, METHODS OF USING SUCH INKS IN FIBER FORMATION, AND ARTICLES COMPRISING SUCH FIBERS

TECHNICAL FIELD

The present invention relates to stable catalyst ink formulations comprising an electrospinning polymer selected from halogen-comprising polymers. The present invention further relates to electrospinning of such ink formulation, to the so-obtained electrospun fibrous mat as well as to articles comprising such electrospun fibrous mat.

BACKGROUND AND DESCRIPTION OF THE PRIOR ART

Proton exchange membrane fuel cells show great potential as future source of electrical energy. However, commercialization has been hindered by cost. The cost of the membrane electrode assembly (MEA) is a significant portion of the total cost of the fuel cell stack and is dominated by the cost of the catalyst, which frequently is platinum. In order to reduce overall costs, it is necessary to reduce the required catalyst loading, for which an increase in catalytic activity, particularly for the oxygen reduction reaction at the cathode in a hydrogen/air fuel cell is of interest.

Significant increases in platinum utilization and corresponding cost reduction can be realized by the employment of a nanostructured electrode layer, rather than a conventional painted or sprayed electrode. In WO 2012/058425, Pintauro and Zhang disclose a nanostructured electrode layer prepared by electrospinning through a metallic needle. Higher performance for a nanofiber MEA with a platinum loading of 0.1 $mg/cm^2$ was reported at 524 $mW/cm^2$ as compared to 519 $mW/cm^2$ for a decal MEA with a platinum loading of 0.4 $mg/cm^2$.

Scaling up production on a needle based electrospinning system is difficult for multiple reasons and may not lead to high enough fiber productivity for sufficient cost reductions.

Higher productivities in fiber production are possible for example with nozzle free (or needle free) systems, such as are for example available from Elmarco s.r.o. Furthermore, nozzle free systems do not have any needle clogging issues, which is a potential problem in the spinning of particle containing solutions. Higher productivities in fiber spinning result in faster line speeds and consequentially in lower manufacturing costs.

Electrospinning inks for the present purposes comprise a catalyst on a carrier, an ionomer, an electrospinning polymer and a solvent. Experiments with the goal of up-scaling the electrospinning of platinum catalyst comprising inks led to the surprising finding of chemical and physical instability of the inks. Ink viscosity measurements indicate for example a drop in viscosity upon mixing time, which without wishing to be bound by theory may be attributed to improved catalyst dispersion or a reduction in the average molecular weight of the polymer. Such an instability phenomenon has hitherto not been documented in the literature. Without wishing to be bound by theory, it is possible that platinum on a carbon carrier might be able to oxidize alcohols, which may be used as solvent in electrospinning inks, to aldehydes, ketones or acids, as for example discussed by M. Nadal and R. D. Gonzalez in Industrial & Engineering Chemistry Product Research and Development 1985, 24, 525-531 for the oxidation of ethanol over $Pt/SiO_2$ catalysts, and in many other references such as Applied Catalysis 1992, A 86, 147-163 and Applied Catalysis B: Environmental 2007, 70, 621-629).

An unstable ink would render producing consistent and reproducible results very difficult in any production process, particularly in an industrial-scale production process. In addition, variations in ink properties would necessitate the constant adaptation of spinning parameters, while still not allowing to produce uniform fibers.

In fuel cell applications electrospun PVDF nanofibers are generally limited to being used in the membrane as is for example disclosed in S. W. Choi et al., Journal of Power Sources 180 (2008), 167-171; in I. Shabani et al., Journal of Membrane Science 368 (2011) 233-240; in H. S. Thiam et al.; International Journal of Hydrogen Energy 38 (2013) 9474-9483; in EP 2 642 569 A1; in S. Cavagliere et al.; Energy Environ. Sci., 2011, 4, 4761; and in Z. Dong et al., Journal of Power Sources 196 (2011) 4886-4904.

However, there seems to be no disclosure on the use of electrospun PVDF nanofibers in any Pt/C comprising electrodes.

It is therefore also one of the objects of the present invention to provide a stable electrospinning ink comprising catalyst, said ink allowing reproducible and consistent processing in an electrospinning process.

SUMMARY OF THE INVENTION

The present inventors have now surprisingly found that the above objects may be attained either individually or in any combination by the ink formulation of the present application.

The present application therefore provides for an ink formulation comprising
(i) metal supported on a carrier,
(ii) an ionomer,
(iii) an electrospinning polymer selected from the group of halogen-comprising polymers, and
(iv) a solvent In addition, the present application provides for a process for the production of an electrospun fibrous mat, said process comprising the steps of
(a) providing to an electrospinning apparatus the above ink formulation, and
(b) subsequently electrospinning the ink formulation to obtain an electrospun fibrous mat.

Furthermore, the present application provides for an electrospun fibrous mat comprising
(i) metal supported on a carrier,
(ii) an ionomer, and
(iii) an electrospinning polymer selected from the group of halogen-comprising polymers.

The present application also provides for a membrane electrode assembly (MEA) comprising said electrospun fibrous mat as well as for a fuel cell comprising such membrane electrode assembly.

DETAILED DESCRIPTION OF THE INVENTION

Figure 1:
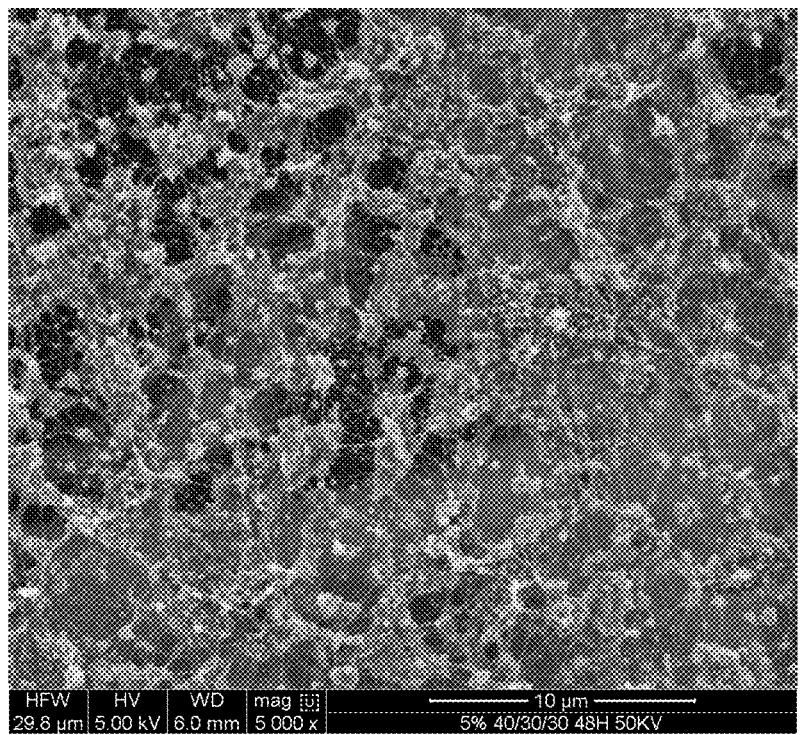
FIG. 1 shows a scanning electron microscope (SEM) image of the electrospun fibrous mat of Example 1.

For the purposes of the present application the term "nozzle-free electrospinning" is used to describe an electrospinning process where the Taylor cones, that result in spinning jets, form on a free surface, like the surface of a cylinder or a surface of a wire upon being coated by a polymer solution (as disclosed for example in U.S. Pat. No. 7,585,437 issued to Jirsak et al.), as opposed to forming at the tip of a needle upon polymer solution injection or extrusion through that needle.

For the purposes of the present application the term "sccm" is used to denote "standard cubic centimeter per minute".

For the purposes of the present application the term "ionomer" is used to denote a polymer composed of macromolecules in which a small but significant proportion of the constitutional units has ionic or ionizable groups or both (see also Pure and Applied Chemistry, Vol. 78, No. 11, pp. 2067-2074, particularly page 2071).

For the purposes of the present application the term "monomer unit" is used to denote the largest constitutional unit contributed to the structure of the polymer by a single monomer molecule.

For the purposes of the present application the terms "monomer" or "monomer molecule" are used synonymously and denote a molecule which can undergo polymerization, thereby contributing a constitutional unit ("monomer unit") to the polymer. The term "halogenated monomer" is used to denote a monomer comprising halogen.

For the purposes of the present application an asterisk ("*") denotes a linkage to an adjacent unit or group, and in case of an oligomer or polymer it may denote a link to an adjacent repeating unit or to any other group comprised in the oligomer or polymer.

In general terms, the present application provides for an ink formulation comprising (i) metal supported on a carrier, (ii) an ionomer, (iii) an electrospinning polymer, and (iv) a solvent.

While any metal that can be supported on a carrier may be used in the present process, it is nevertheless preferred that the metal is selected from the group consisting of Sc, Y, Ti, Zr, Hf, V, Nb, Ta, Cr, Mo, W, Fe, Ru, Os, Co, Rh, Ir, Ni, Pd, Pt, Cu, Ag, Au, Zn, Cd, Hg, lanthanides, actinides and any blend thereof. More preferably said metal may be selected from the group consisting of Co, Rh, Ir, Ni, Pd, Pt, Cu, Ag and Au. Even more preferably said metal may be selected from the group consisting of Ni, Pd, Pt, Cu, Ag and Au. Still even more preferably said metal may be selected from the group consisting of Ni, Pd and Pt. Most preferably said metal is Pt.

The carrier on which the metal is supported may be any inert material onto which metals can be supported. Suitable examples of such carriers may be selected from the group consisting of carbon, oxides, halides and blends thereof. Suitable oxides may for example be selected from the group consisting of alumina, magnesia, silica, and any blends of these. A suitable halide is for example magnesium chloride. The most preferred carrier on which the metal is supported is carbon.

The ionomer used herein may be described by formula (I)

(I)

wherein $M_A$ is an electrically neutral repeating unit;

$M_B$ is an ionic or ionizable repeating unit;

a is at least 1 and at most 50;

b is 1; and c is at least 5 and at most 10,000.

Preferred electrically neutral repeating units $M_A$ may be represented by general formula —$CR^1R^2$—$CR^3R^4$—$(X^1)_d$— wherein $R^1$, $R^2$, $R^3$, $R^4$, $X^1$ and d are as defined below.

$R^1$, $R^2$, $R^3$ and $R^4$ are independently of each other selected from the group consisting of H, F, Cl, Br, I, alkyl having from 1 to 20 carbon atoms, aryl having from 6 to 10 carbon atoms and aryl having from 6 to 10 carbon atoms substituted with an alkyl having from 1 to 10 carbon atoms as well as analogous alkyl and aryl wherein one or more hydrogens are replaced by fluorine. More preferably $R^1$, $R^2$, $R^3$ and $R^4$ are independently of each other selected from the group consisting of H, F, alkyl having from 1 to 10 carbon atoms, aryl having from 6 to 10 carbon atoms and aryl having from 6 to 10 carbon atoms substituted with an alkyl having from 1 to 10 carbon atoms as well as analogous alkyl and aryl wherein one or more hydrogens are replaced by fluorine. Even more preferably $R^1$, $R^2$, $R^3$ and $R^4$ are independently of each other selected from the group consisting of H, F, methyl, ethyl and phenyl as well as the respective analogues of methyl, ethyl and phenyl wherein one or more hydrogens are replaced by fluorine. Most preferably $R^1$, $R^2$, $R^3$ and $R^4$ are F.

Examples of alkyl having from 1 to 10 carbon atoms are methyl, ethyl, n-propyl, i-propyl, n-butyl, i-butyl, s-butyl, t-butyl, 2-methylbutyl, n-pentyl, s-pentyl, cyclopentyl, neopentyl, n-hexyl, cyclohexyl, neo-hexyl, n-heptyl, cycloheptyl, n-octyl, cyclooctyl, 2-ethylhexyl, nonyl and decyl as well as the respective fluorinated analogues wherein one or more hydrogen is replaced by fluorine.

Preferred examples of alkyl having from 1 to 10 carbon atoms are methyl, ethyl, n-propyl, i-propyl, s-butyl, n-pentyl and n-hexyl as well as the respective fluorinated analogues wherein one or more hydrogen is replaced by fluorine.

$X^1$ may be selected from the group consisting of O, S, $NR^5$ and $PR^5$, with $R^5$ being selected from the group consisting of H, alkyl having from 1 to 20 carbon atoms, aryl having from 6 to 10 carbon atoms and aryl having from 6 to 10 carbon atoms substituted with an alkyl having from 1 to 10 carbon atoms as well as analogous alkyl and aryl wherein one or more hydrogens are replaced by fluorine. Most preferably $X^1$ is O.

d may be 0 or 1. Preferably d is 0.

Preferred ionic or ionizable repeating units $M_B$ may be represented by general formula —$(CR^6R^7)_e$—$(CR^8R^9)$— wherein $R^6$, $R^7$, $R^8$, $R^9$ and e are as defined below, $R^6$, $R^7$ and $R^8$ are independently of each other selected as defined above for $R^1$, $R^2$, $R^3$ and $R^4$.

e may be 0 or 1. Preferably e is 1.

$R^9$ may be represented by general formula —$(R^{10})_f$—$X^2$ wherein $R^{10}$, f and $X^2$ are as defined below.

f may be 0 or 1. Preferably f is 1.

$X^2$ may be —$SO_3H$ or —$PO_3H_2$. Preferably $X^2$ is —$SO_3H$.

$R^{10}$ is represented by general formula —$(X^3)_g$—$(R^{11})_h$—$(X^4)_i$—$(R^{12})_j$— with $X^3$, $X^4$, $R^{11}$, $R^{12}$, g, h, i and j as defined below.

$X^3$ and $X^4$ are independently of each other selected from the group consisting of O, S, $NR^5$ and $PR^5$, with $R^5$ as defined earlier. Preferably $X^3$ and $X^4$ are O.

g, h, I and j may independently of each other be at least 0 and at most 10, preferably at least 1 and at most 5.

$R^{11}$ and $R^{12}$ may be independently selected from the group consisting of alkanediyl having from 1 to 10 carbon atoms, arylene having from one to 6 to 10 carbon atoms and arylene having from 6 to 10 carbon atoms substituted with an alkyl having from 1 to 10 carbon atoms as well as analogous alkyl and aryl wherein one or more hydrogens are replaced by fluorine.

Examples of alkanediyl having from 1 to 10 carbon atoms are methylene (—$CH_2$—), ethanediyl, n-propanediyl, i-propanediyl etc. as well as the respective analogues wherein one or more hydrogen is replaced by a fluorine.

Particularly preferred are ionomers of general formula (II)

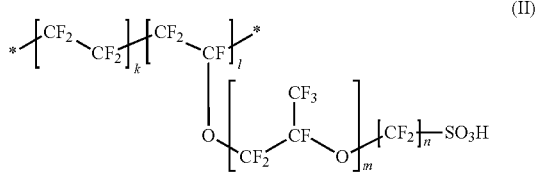

wherein k is at least 6 and at most 10, l is 1, m is 0 or 1 and n is at least 2 and at most 4. An example of such an ionomer is Nafion™, which is commercially available from DuPont.

Suitable solvents may be selected from the group consisting of water and organic solvents. Preferred solvents are selected from the group consisting of water, ethers of general formula $R^{13}$—O—$R^{14}$, alcohols of general formula $R^{15}$—OH, ketones of general formula $R^{16}$—C(=O)—$R^{17}$, amides of general formula $(R^{16})_2N$—C(=O)—$R^{17}$ and any blends thereof, wherein $R^{13}$, $R^{14}$, $R^{15}$ and $R^{16}$ are independently of each other selected from alkyl having from 1 to 10 carbon atoms and fluorinated alkyl having from 1 to 10 carbon atoms, and $R^{17}$ is selected from the group consisting of H, alkyl having from 1 to 10 carbon atoms and fluorinated alkyl having from 1 to 10 carbon atoms, or $R^{13}$ and $R^{14}$ may together be selected from alkanediyl having from 4 to 6 carbon atoms and fluorinated alkanediyl having from 4 to 6 carbon atoms, or $R^{16}$ and $R^{17}$ may together be selected from alkanediyl having from 4 to 6 carbon atoms and fluorinated alkanediyl having from 4 to 6 carbon atoms. With respect to $R^{13}$, $R^{14}$, $R^{15}$, $R^{16}$ and $R^{17}$ the term "fluorinated" means that at least one hydrogen is replace by fluorine.

Examples of particularly suited ethers are dimethylether, ethylmethylether, diethylether, butylethylether, diisoproylether, tetrahydrofurane, the respective fluorinated analogues and any blend of these.

Examples of particularly suited alcohols are methanol, ethanol, n-propanol, i-propanol, 1-butanol, 2-butanol, 2-methyl-1-propanol, 1-pentanol, 2-pentanol, 3-pentanol, 2-methyl-1-butanol, 2-methyl-2-butanol, 3-methyl-1-butanol, 3-methyl-2-butanol, the respective fluorinated analogues and any blends of these. Preferred examples are methanol, ethanol, n-propanol, i-propanol and any blends of these. Most preferred examples are n-propanol, i-propanol and any blend of these.

Examples of particularly suited ketones are acetone, 2-butanone (ethylmethylketone), 2-pentanone, 3-pentanone, 2-hexanone, 3-hexanone, 4-hexanone, 2-ocatanone, 3-octanone, 4-octanone, acetophenone, the respective fluorinated analogues and any blend of these. The most preferred ketone is acetone.

Examples of particularly suited amides are N,N-dimethylformamide ("DMF") and N,N-dimethylacetamide ("DMAc").

Preferably said solvent comprises water and an alcohol of general formula $R^{15}$—OH as defined above. More preferably said solvent consists of water and an alcohol of general formula $R^{15}$—OH as defined above.

The electrospinning polymer comprised in the present ink formulation comprises at least one halogen-comprising polymer. Preferably, said halogen-comprising polymer comprises fluorine, chlorine or both. More preferably, said halogen-comprising polymer comprises fluorine, or fluorine and chlorine. Most preferably, said halogen-comprising polymer comprises fluorine.

In case the present electrospinning polymer comprises two or more halogen-comprising polymers they are different from each other.

The electrospinning polymer is different from the ionomer defined earlier in the present application. Preferably, the electrospinning polymer does not comprise any ionic or ionizable repeating unit.

Expressed differently, said halogen-comprising polymer preferably comprises monomer units comprising fluorine, chlorine and both, fluorine and chlorine. More preferably, said halogen-comprising polymer comprises monomer units comprising fluorine or fluorine and chlorine. Most preferably, said halogen-comprising polymer comprises monomer units comprising fluorine.

The present halogen-comprising polymer may for example be a homopolymer or a copolymer. A homopolymer may be characterized in that it consists of identical monomer units only. On the other hand, a copolymer may be characterized in that it consists of more than one type of monomer units. The term "type of monomer unit" is used to denote identical monomer units; a homopolymer can for example be said to consist of a single type of monomer. As examples of copolymers, random copolymers or block copolymers may be mentioned.

Preferably, said halogen-comprising polymer comprises an alkanediyl monomer unit of general formula (III)

wherein $Y^1$, $Y^2$, $Y^3$, p, q and r are as defined in the following.

p is selected from the group consisting of 1, 2, 3 and 4, q is selected from the group consisting of 0, 1, 2 and 3, and r is selected from the group consisting of 0, 1, 2 and 3, with the provision that p+q+r≤4. Most preferably, p is selected from the group consisting of 1, 2, 3 and 4, q is selected from the group consisting of 0, 1 and 2, and r is 1, with the provision that p+q+r≤4.

$Y^1$ is fluorine.

$Y^2$ is chlorine.

$Y^3$ is, at each occurrence independently of the other, selected from the group consisting of alkyl having from 1 to 20 carbon atoms, halogenated alkyl having from 1 to 20 carbons atoms, alkoxy having from 1 to 20 carbon atoms and halogenated alkoxy having from 1 to 20 carbon atoms. Preferably, $Y^3$ is, at each occurrence independently of the other, selected from the group consisting of alkyl having from 1 to 10 carbon atoms, halogenated alkyl having from 1 to 10 carbon atoms, alkoxy having from 1 to 10 carbon atoms, and halogenated alkoxy having from 1 to 10 carbon atoms. Most preferably $Y^3$ is selected from alkyl having from 1 to 10 carbon atoms or halogenated alkyl having from 1 to 10 carbon atoms.

For $Y^3$ suitable examples of alkyl having from 1 to 10 carbon atoms may be selected from the group consisting of methyl, ethyl, n-propyl, i-propyl, n-butyl, i-butyl, s-butyl, t-butyl, 2-methylbutyl, n-pentyl, s-pentyl, cyclopentyl, neo-pentyl, n-hexyl, cyclohexyl, neo-hexyl, n-heptyl, cycloheptyl, n-octyl, cyclooctyl, 2-ethylhexyl, nonyl and decyl, and more preferably from the group consisting of methyl, ethyl, n-propyl, i-propyl, s-butyl, n-pentyl and n-hexyl, with methyl being most preferred.

For $Y^3$ suitable examples of alkoxy having from 1 to 10 carbon atoms may be represented by general formula —O—$R^{20}$, wherein $R^{20}$ is selected from alkyl having from 1 to 10 carbon atoms as defined above in respect to $Y^3$.

The terms "halogenated alkyl" and "halogenated alkoxy" are used to denote alkyl resp. alkoxy wherein at least one of the hydrogen atoms is replaced by halogen, preferably by fluorine or chlorine, or if more than one hydrogen atom is replaced, preferably by fluorine or chlorine or both.

With regards to $Y^3$, in said alkyl or halogenated alkyl one or more carbon atoms may optionally be replaced by a heteroatom. Suitable heteroatoms may, for example be selected from the group consisting of —O—, —S—, —Se—, —N($R^{18}$)—, =N—, —P($R^{18}$)—, —Si($R^{18}$)($R^{19}$)—, and —Ge($R^{18}$)($R^{19}$)—, wherein $R^{18}$ and $R^{19}$ are independently of one another selected from alkyl having from 1 to 20 carbon atoms and cycloalkyl having from 3 to 20 carbon atoms. $R^{18}$ and $R^{19}$ may optionally be halogenated, i.e. comprise at least one halogen, preferably fluorine or chlorine and most preferably fluorine. Preferably suitable heteroatoms may be selected from the group consisting of —O—, —S—, —N($R^{18}$), =N—, and —Si($R^{18}$)($R^{19}$)—, with $R^{18}$ and $R^{19}$ as defined above. Most preferably, the suitable heteroatom is —O—.

Preferred examples of suitable monomer units of general formula (III) may be selected from the group consisting of the following formulae (III-1) to (III-39)

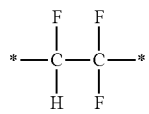 (III-1)

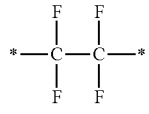 (III-2)

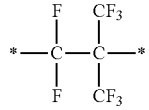 (III-3)

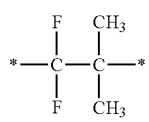 (III-4)

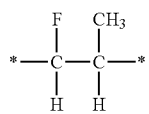 (III-5)

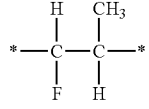 (III-6)

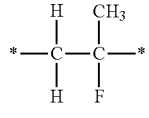 (III-7)

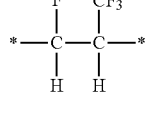 (III--8)

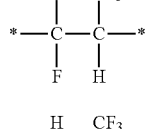 (III-9)

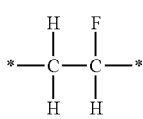 (III-10)

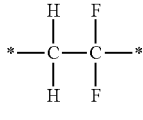 (III-11)

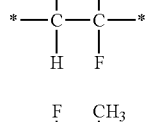 (III-12)

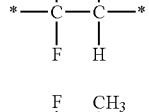 (III-13)

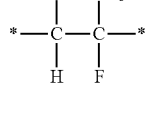 (III-14)

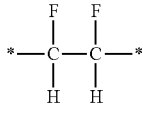 (III-15)

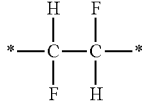 (III-16)

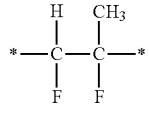 (III-17)

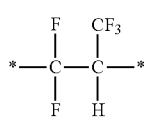 (III-18)

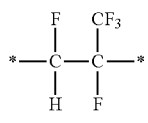 (III-19)

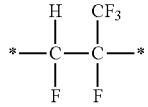 (III-20)

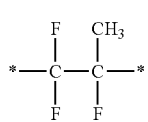 (III-21)

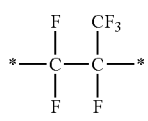 (III-22)

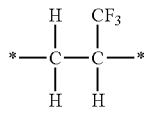 (III-23)

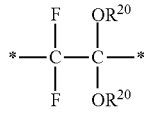 (III-24)

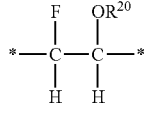 (III-25)

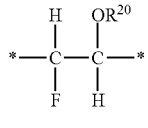 (III-26)

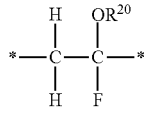 (III-27)

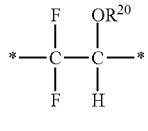 (III-28)

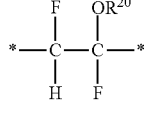 (III-29)

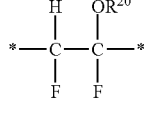 (III-30)

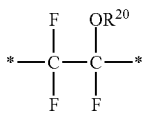 (III-31)

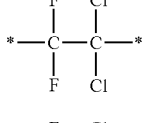 (III-32)

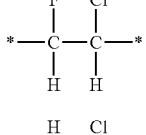 (III-33)

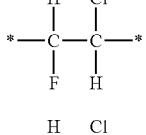 (III-34)

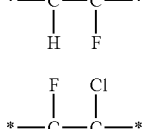 (III-35)

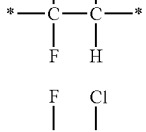 (III-36)

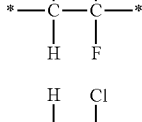 (III-37)

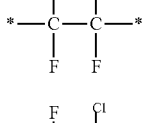 (III-38)

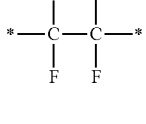 (III-39)

Of monomer units (III-1) to (III-39), monomer units (III-2), (III-6), (III-21), (III-31), (III-32) and (III-39) are more preferred. Even more preferred are monomer units selected from the group consisting of (III-2), (III-6) and (III-21). Still even more preferred are monomer units of formula (III-2) or formula (III-6). Most preferred is the monomer unit of formula (III-2).

The monomer units of general formula (III) may be obtained from the respective olefin or epoxide (oxiran-type) monomers by polymerization using standard methods.

In addition to said one or more type of monomer unit of general formula (III) the present halogen-comprising polymer may also comprise one or more type of non-halogenated monomer unit, derived by polymerization from non-halogenated monomer.

Preferred examples of such non-halogenated monomer may be selected from non-halogenated olefins, more preferably from non-halogenated olefins having from 2 to 20 carbon atoms and even more preferably from non-halogenated olefins having from 1 to 10 carbon atoms, wherein optionally one or more carbon atom not forming part of an olefinic bond (i.e. the carbon-carbon double bond) may be replaced by a heteroatom as defined above.

Examples of suitable halogen-comprising polymers may be selected from the group consisting of polytetrafluoroethylene (PTFE), polyvinylidene fluoride (PVDF), poly(hexafluoropropylene), and polyvinyl fluoride (PVF). Of these polytetrafluoroethylene (PTFE) and polyvinylidene fluoride (PVDF) are preferred. Polyvinylidene fluoride (PVDF) is most preferred.

Such halogen-comprising polymers are available from a number of commercial suppliers, such as for example Arkema, Solvay and DuPont to only mention a few.

Optionally, said electrospinning polymer may further comprise a polymer different from the halogen-comprising polymer as defined above. Such polymer different from said halogen-comprising polymer may for example be selected from the group consisting of poly(acrylic acid), polymethacrylate, polyamide, polyimide, polyurethane, polybenzimidazole, polycarbonate, polyacrylonitrile, poly(vinyl alcohol), poly(lactic acid), polyethylene oxide, polystyrene, polyaniline, polyethylene terephthalate, polybutylene terephthalate, poly(acryl amide), polycaprolactone, poly(ethylene co-vinyl alcohol), polysulfone (PSU), polyethersulfone (PES), and any blends of these.

In the case of said electrospinning polymer comprising a polymer different from the halogen-comprising polymer as defined above, such polymer different from said halogen-comprising polymer is comprised in said electrospinning polymer preferably in at most 20 wt % or 10 wt %, more preferably in at most 5 wt %, even more preferably in at most 1 wt %, still even more preferably in at most 0.1 wt % or 0.05 wt % or in at most 0.01 wt %. Most preferably, however, said electrospinning polymer consists of halogen-comprising polymers only.

An electrospinning polymer may be added for a number of reasons. For example, the addition of an electrospinning polymer may be used to change the viscosity of the electrospinning ink formulation, which in turn influences the formation of fibers in the electrospinning process. The addition of an electrospinning polymer may also help improving the spinnability of an electrospinning ink formulation that is otherwise difficult to spin because its components do not lend themselves well to electrospinning.

The preparation of an electrospinning ink formulation may be done by mixing the components of the ink formulation, for example by ball milling, magnetic stirring, mechanical stirring, shaking, sonication, homogenization or any method making use of more than one of these. The choice in mixing method may depend upon the nature of the compositions to be mixed. For example it might be useful to mix the first composition by ball milling if the metal supported on the carrier is present in bigger particles, which need to be reduced in size. Sonication and magnetic stirring or a combination of both, possibly several repeat intermittent cycles of sonication and magnetic stirring have proven to be particularly useful.

The duration of mixing is not particularly limited and may also depend upon the nature of the respective composition. For example the duration of mixing may be chosen in the range from a few seconds to one week or even longer. It may for example be at least 1 s, 5 s 10 s, 30 s, 1 min, 5 min, 10 min, 30 min, 1 h, 2 h, 3 h, 4 h, 5 h, 6 h, 9 h, 12 h, 15 h, 18 h, 21 h, 1 day, 2 days, 3 days, 4 days, 5 days, 6 days, 7 days or even longer.

As an alternative to room temperature the mixing may also be performed at higher or lower temperature. The choice in temperature may also depend on the nature of the respective composition to be mixed and may for example be chosen based on the miscibility and/or solubility and/or thermal stability of the components of the composition to be mixed.

Preferably the electrospinning ink comprises at least 1 wt % (for example at least 1 wt % or 2 wt % or 3 wt % or 4 wt % or 5 wt %) of the combined fractions of metal with carrier, ionomer and electrospinning polymer, with wt % being relative to the total weight of the electrospinning ink.

Preferably the electrospinning ink comprises at most 30 wt % (for example at most 25 wt % or 20 wt % or 19 wt % wt % or 18 wt % or 17 wt % or 16 wt % or 15 wt % or 14 wt % or 13 wt % or 12 wt % or 11 wt % or 10 wt %) of the combined amounts of metal with carrier, ionomer and electrospinning polymer, with wt % being relative to the total weight of the electrospinning ink.

Preferably the electrospinning ink comprises metal with carrier, ionomer and electrospinning polymer in a ratio of A:B:C, wherein A i.e. metal together with carrier, is at least 10 parts and at most 80 parts, for example at least 12 or 14 or 16 or 18 or 20 or 22 or 24 or 26 or 28 or 30 or 32 or 34 or 36 or 38 or 40 or 42 or 44 or 46 or 48 or 50 parts, and for example at most 80 or 78 or 76 or 74 or 72 or 70 parts;

B is at least 1 part and at most 40 parts, for example at least 2 or 3 or 4 or 5 or 6 or 7 or 8 or 9 or 10 or 11 or 12 or 13 or 14 or 15 parts, and for example at most 38 or 36 or 34 or 32 or 30 parts; and C is at most 60 parts, for example at most 58 or 56 or 54 or 52 or 50 or 48 or 46 or 44 or 42 or 40 or 38 or 36 or 34 or 32 or 30 or 28 or 26 or 24 or 22 or 20 or 18 or 16 or 14 or 12 or 10 or 8 or 6 or 4 or 2 or 1.5 or 1 or 0.5 or 0.1 or 0.01 or 0.001 parts, provided that the sum of A, B and C is 100 parts, with parts being given in weight percent relative to the total weight of the catalyst (metal with carrier), ionomer and electrospinning polymer.

The so-obtained electrospinning ink is electrospun in electrospinning equipment to obtain the electrospun fibrous mat.

The electrospinning equipment used in the present invention may be any type of electrospinning equipment. It is, however, preferred that said electrospinning equipment is a so-called nozzle-free electrospinning equipment. The term "nozzle-free" is to denote that the electrospinning ink is not passed through a needle.

In a nozzle-free electrospinning process the electrospinning ink may for example be placed in a bath, into which a rotating drum or alternatively a rotating wire electrode is dipped. A fine layer of electrospinning ink is carried by the rotating drum or wire electrode and exposed to an electric field which is established between high voltage source and ground electrode, or an oppositely charged source. Due to the electric field a number of jets of electrospinning ink are generated and collected on a moving collecting belt, which is preferably placed between rotating drum or wire electrode and ground electrode so as to result in an electrospun fibrous mat.

A nozzle-free electrospinning process and the respective equipment are for example disclosed in WO 2005/024101, WO 2006/131081, and WO 2008/106903, all assigned to Elmarco S. R. O. (Liberec, Czech Republic), a commercial supplier of nozzle-free electrospinning equipment.

Electrospinning parameters may depend upon the nature and properties of the electrospinning ink. The determination of such electrospinning parameters is, however, well within the capabilities of the skilled person.

Preferably the distance between the surface of the bath, where the electrospinning ink is kept, and the moving collecting belt is at least 0.01 m and at most 2 m. Said distance may for example be at least 0.05 m or 0.1 m or 0.2 m or 0.3 m or 0.4 m or 0.5 m. Said distance may for example be at most 1.9 m or 1.8 m or 1.7 m or 1.6 m.

Preferably the electrospinning process is performed at an applied voltage of at least 1.0 kV and of at most 200 kV. Said applied voltage may for example be at least 2.0 kV or 3.0 kV or 4.0 kV or 5.0 kV or 10 kV. Said applied voltage may for example be at most 150 kV or 100 kV or 90 kV or 80 kV or 70 kV.

In one aspect of the present invention, any of a variety of porous single or multilayered substrates or supports can be arranged on the moving collecting belt and combined with the electrospun fibrous mat, thereby forming a composite.

Examples of single or multilayered porous substrates or supports include, but are not limited to, spunbonded nonwovens, meltblown nonwovens, needle punched nonwovens, spunlaced nonwovens, wet laid nonwovens, resin-bonded nonwovens, woven fabrics, knit fabrics, apertured films, paper, and combinations thereof.

In another aspect of the present invention the present electrospun fibrous mat may be bonded to a porous substrate or support. Bonding may be accomplished by known methods in the art, including but not limited to thermal calendering between heated smooth nip rolls, ultrasonic bonding, and through gas bonding. Bonding increases the strength and the compression resistance of the medium so that the medium may withstand the forces associated with being handled, being formed into a useful device, and depending on the bonding method used, may result in the adaptation of physical properties such as thickness, density, and the size and shape of the pores.

For instance, thermal calendering can be used to reduce the thickness and increase the density and reduce the porosity of the electrospun nanofiber mat medium, and reduce the size of the pores. This in turn decreases the flow rate through the medium at a given applied differential pressure. In general, ultrasonic bonding will bond to a smaller area of the electrospun nanofiber mat medium than thermal calendering, and therefore has a lesser effect on thickness, density and pore size. Gas bonding generally has minimal effect on thickness, density and pore size, therefore this bonding method may be preferable in applications in which maintaining higher fluid flow rate is desired.

When thermal calendering is used, care must be taken not to over-bond the electrospun fibrous mat, such that the nanofibers melt and no longer retain their structure as individual fibers. In the extreme, over-bonding would result in the nanofibers melting completely such that a film would be formed. One or both of the nip rolls used is heated to a temperature of between about ambient temperature, e.g., about 25° C., and about 300° C. The fibrous mat(s) and/or porous support or substrate, can be compressed between the nip rolls at a pressure ranging from about 0 lb/in to about 1000 lb/in (178 kg/cm). The nanofiber mat(s) can be compressed at a line speed of at least about 10 ft/min (3 m/min).

Calendering conditions, e.g., roll temperature, nip pressure and line speed, can be adjusted to achieve the desired solidity. In general, application of higher temperature, pressure, and/or residence time under elevated temperature and/or pressure results in increased solidity.

Other mechanical steps, such as stretching, cooling, heating, sintering, annealing, reeling, unreeling, and the like, may optionally be included in the overall process of forming, shaping and making the electrospun fibrous mat as desired.

For example, the present electrospun fibrous mat may be stretched in a single step or a plurality of steps as desired. Depending on the stretching method used to stretch the electrospun fibrous mat, stretching can adjust the physical properties of the mat including thickness, density, and the size and shape of the pores formed in the mat. For example, if the electrospun fibrous mat is stretched in a single direction (uniaxial stretching), the stretching may be accomplished by a single stretching step or a sequence of stretching steps until the desired final stretch ratio is attained.

Similarly, if the electrospun fibrous mat is stretched in two directions (biaxial stretching), the stretching can be conducted by a single biaxial stretching step or a sequence of biaxial stretching steps until the desired final stretch ratios are attained. Biaxial stretching may also be accomplished by a sequence of one or more uniaxial stretching steps in one direction and one or more uniaxial stretching steps in another direction. Biaxial stretching steps where the electrospun fibrous mat is stretched simultaneously in two directions and uniaxial stretching steps may be conducted in sequence in any order.

Methods for stretching the electrospun fibrous mat are not particularly limited, and use may be made of ordinary tentering, rolling, or inflation or a combination of two or more of these. The stretching may be conducted uniaxially, biaxially, etc. In the case of biaxial stretching, machine-direction stretching and transverse-direction stretching may be conducted either simultaneously or successively.

Various types of stretching apparatus are well known in the art and may be used to accomplish stretching of the electrospun fibrous mat according to the present invention. Uniaxial stretching is usually accomplished by stretching between two rollers wherein the second or downstream roller rotates at a greater peripheral speed than the first or upstream roller. Uniaxial stretching can also be accomplished on a standard tentering machine.

Biaxial stretching may be accomplished by simultaneously stretching in two different directions on a tentering machine. More commonly, however, biaxial stretching is accomplished by first uniaxially stretching between two differentially rotating rollers as described above, followed by either uniaxially stretching in a different direction using a tenter machine or by biaxially stretching using a tenter machine. The most common type of biaxial stretching is where the two stretching directions are approximately at right angles to each other. In most cases where a continuous sheet is being stretched, one stretching direction is at least approximately parallel to the long axis of the sheet (machine direction) and the other stretching direction is at least approximately perpendicular to the machine direction and is in the plane of the sheet (transverse direction).

After the electrospun fibrous mat has been stretched either uniaxially or biaxially, the stretched porous electrospun fibrous mat can again be calendered. The stretched electrospun fibrous mat can be forwarded to a pair of heated calender rolls acting cooperatively so as to form a mat of reduced thickness compared to the mat exiting from the stretching apparatus. By regulating the pressure exerted by these calendar rolls along with the temperature, the pore size of the final electrospun fibrous mat can be controlled as desired, thereby allowing for the adjustment of the average pore size.

The electrospun fibrous mat may be heated by any of a wide variety of techniques prior to, during, and/or after stretching. Examples of these techniques include radiative heating such as that provided by electrically heated or gas fired infrared heaters, convective heating such as that provided by re-circulating hot air, and conductive heating such as that provided by contact with heated rolls. The temperatures which are measured for temperature control purposes may vary according to the apparatus used and personal preference.

In general, the temperature or temperatures can be controlled such that the electrospun fibrous mat is stretched about evenly so that the variations, if any, in thickness of the stretched mat are within acceptable limits and so that the amount of stretched microporous electrospun fibrous mat outside of those limits is acceptably low. It will be apparent that the temperatures used for control purposes may or may not be close to those of the electrospun fibrous mat itself since they depend upon the nature of the apparatus used, the locations of the temperature-measuring devices, and the identities of the substances or objects whose temperatures are being measured.

In a subsequent step the electrospun fibrous mats, either as directly obtained from the electrospinning process or post-treated as described above, may be used as anode or cathode or both in a membrane electrode assembly.

Figure 9:
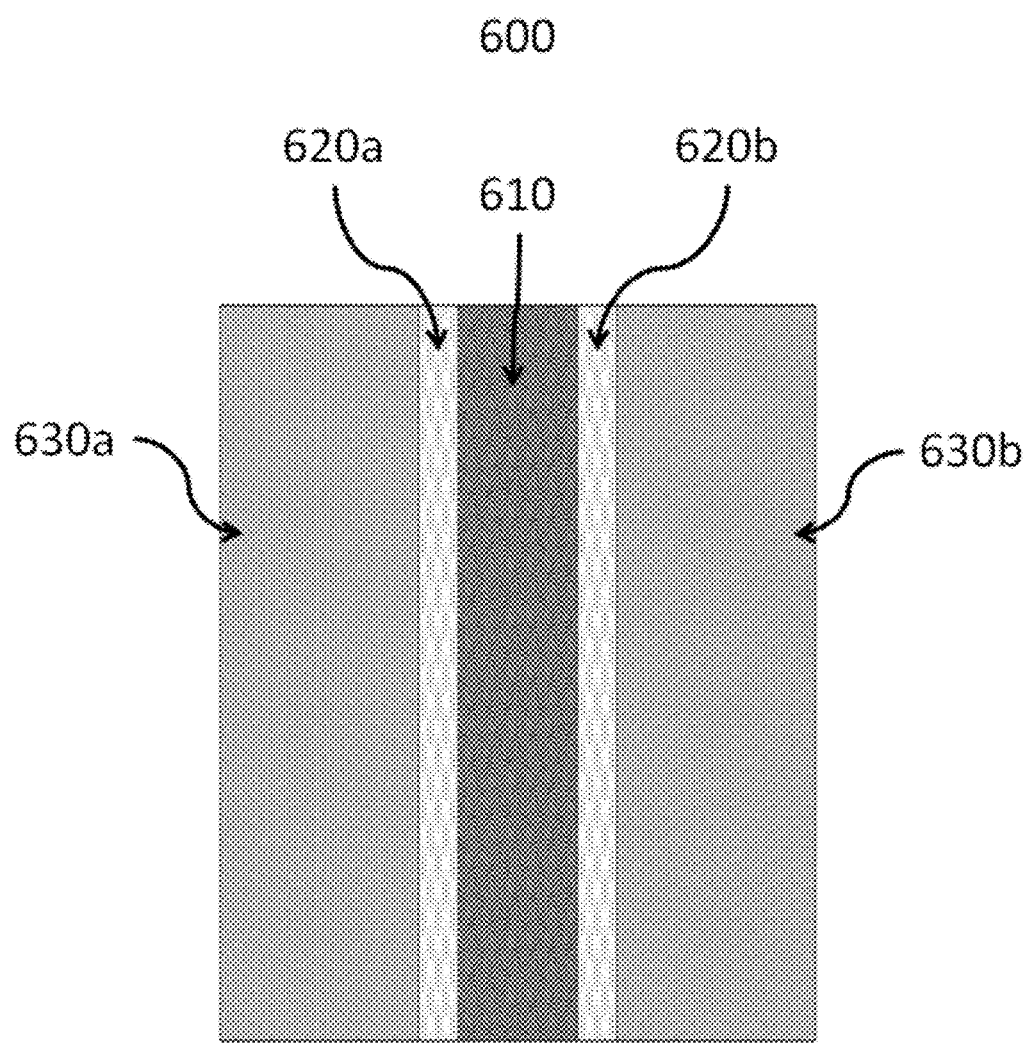
FIG. 9 shows a schematic representation of an exemplary membrane electrode assembly.

A schematic representation of a membrane electrode assembly (600), as is for example used in a fuel cell, such as for example a proton exchange membrane fuel cell, is shown in FIG. 9. A typical membrane electrode assembly for a fuel cell comprises two gas diffusion layers (GDL) (630a, 630b), with adjacent catalyst electrode layers (620a, 620b), cathode and anode. At the anode, a first catalyst layer helps in separating hydrogen into protons and electrons. The resulting protons then travel through proton exchange membrane (610) to the cathode, at which a second catalyst layer helps in combining the protons with oxygen and electrons to form water and heat. On either side, such membrane electrode assembly may further comprise a device, such as for example a flow-field plate, directing hydrogen to the anode and oxygen to the cathode.

Catalyst layers 620a and 620b may be the same or different. In an aspect of the present invention such catalyst layers comprise the electrospun fibrous mat in accordance with the present invention. As fuel cell catalyst frequently platinum is used.

The proton exchange membrane (610) may generally be an ionomer, and may for example be produced from Nafion™.

Test Methods

Viscosity measurement method: Viscosity of inks was measured using a Brookfield DV-II+ Pro viscometer (Middleboro, Mass., USA) equipped with an appropriate spindle (e.g. S31, S34). About 15 ml of solution was placed in a 20 ml jar and capped. The samples were then kept in a water bath at 25° C. for at least 30 min for temperature equilibration. Spindles were immersed into the jar and a suitable spindle rotation speed (rpm) was selected based on the torque reading. Viscosity data was recorded at a variety of spindle speeds to capture the shear thinning behavior of the ink sample and to help compare data against various inks that span a wide range of viscosities.

Conductivity measurement method: Conductivity of ink samples was measured using a Mettler Toledo SevenCompact conductivity meter equipped with an InLab 731 conductivity probe. About 15 ml of solution was placed in a 20 ml jar and capped. The samples were then kept in a water bath at 25° C. for at least 30 min for temperature equilibration. The probe was then immersed in the jar and the ink conductivity data was collected.

Calculation of platinum loading: Platinum catalyst loading was calculated by multiplying the weight of the electrospun mat (determined from the weight of the electrode before and after electrospinning) by the weight fractions of Pt catalyst used in its preparation, and reported in $mg_{Pt}/cm^2$, assuming a homogeneous catalyst particle distribution within the fibrous mat.

Fiber diameter measurement: Fiber diameter was determined as follows: A scanning electron microscope (SEM) image was taken at 20,000 times magnification of each nanofiber mat sample. The diameters of at least ten (10) clearly distinguishable nanofibers were measured from each SEM image, recorded and averaged.

Electrochemical surface area determination: The active electrochemical surface area of the fuel cell cathode (working electrode) was determined by in-situ cyclic voltammetry in a fuel cell test fixture at 30° C. with fully humidified $H_2$ and $N_2$ flowing at the anode and cathode, respectively. Using a VersaSTAT 4 potentiostat (Princeton Applied Research, Oak Ridge, Tenn.), the voltage of the working electrode was cycled from 0.04 to 0.9 V (vs. SHE) at 100 mVs to remove surface oxides from the catalyst surface, and at 20 mVs for surface area calculation. The active surface area was determined by integrating the $H_2$ adsorption/desorption peaks of the curve, subtracting the double-layer capacitance, and averaging to obtain the hydrogen adsorption charge density ($q_H$, Coulomb/cm²). The active surface area is calculated from the following equation:

$$ESA\left(\frac{m_{Pt}^2}{g_{Pt}}\right) = \frac{q_H}{\Gamma \cdot L}$$

where $\Gamma$ is the charge required to reduce a monolayer of protons onto a smooth Pt surface ($\Gamma$=210 $\mu C/cm^2_{Pt}$), and L is the catalyst loading of the electrode, in $g_{Pt}/m^2_{electrode}$.

Fuel cell performance evaluation: Single-cell performance was evaluated in a hydrogen/air fuel cell (5 cm² MEA) connected to an 850E test stand from Scribner Associates, Inc. (Southern Pines, N.C.). The cell temperature was maintained at 80° C. with no backpressure, with reagent gas flows of 125 sccm $H_2$ at the anode and 500 sccm air at the cathode, both at 80° C. and 100% RH (% relative humidity). Polarization curves were obtained by scanning voltage from 0.2 V to open-circuit voltage, with one minute of equilibration between recordings.

EXAMPLES

The following non-limiting examples further illustrate the advantages of the present invention.

The following abbreviations are used: PVDF for polyvinylidene fluoride, PVP for polyvinylpyrrolidone, PVA for polyvinyl alcohol, DMF for N,N-dimethylformamide, DMAc for N,N-dimethylacetamide, and TFE for trifluoroethanol.

Example 1

An electrospinning ink formulation was prepared by mixing 40 wt % Pt on carbon black (HiSpec™ 4000 Pt/C catalyst powder, Johnson Matthey Plc, London, UK) first with dimethylacetamide (DMAc), then with Nafion™ ion exchange resin (D2021 20 wt % ionomer in alcohol/water, DuPont, Wilmington, Del., USA), previously dried and resuspended in DMAc, with intermittent stirring and sonication, and then adding the electrospinning polymer solution comprising polyvinylidene fluoride (PVDF, Kynar 761, Arkema) in DMAc. The amounts of the respective components added were chosen such that the resulting ink formulation had a weight ratio of Pt/C:Nafion™:PVDF of 40:30:30, and the total combined content of polymer and catalyst was 8.8 wt % with respect to the total weight of the ink formulation.

Following the addition of the electrospinning polymer solution the ink formulation was stirred magnetically for three days, with daily removal and subsequent nozzle-free electrospinning of a portion of the ink formulation. Viscosity of the ink formulation was measured after having stirred the ink formulation for three hours and once daily for three days.

Nozzle-free electrospinning was performed in an NS LAB 200 nozzle-free electrospinning apparatus (Elmarco s.r.o., Liberec, CZ) to obtain an electrospun mat. A smooth non-woven substrate (part number #HOP-60HCF from Hirose Paper Manufacturing Co. Ltd., Tosa-City, Kochi, Japan) was used as collecting substrate. 20 ml of the ink formulation were poured into the electrospinning bath and spun onto the non-woven substrate using a 4-wire spinning electrode under nominal 50 kV electric field. The distance between the surface of the electrospinning bath and the collecting substrate was ca. 100 cm.

Very little product was obtained after 3 hours of mixing. After 23, 48 and 67 hours of mixing, a beaded structure was obtained, with clusters of Pt/C connected by thin polymer fibers. A SEM (scanning electron microscopy) picture obtained from the electrospinning run after 48 hours of mixing is given in FIG. 1.

The results show that catalyst-comprising electrospun mats can be obtained using PVDF as electrospinning polymer and that indeed PVDF and Nafion™ can be electrospun together, thus allowing for the use of the electrospun mat in a fuel cell application.

Example 2

An electrospinning ink formulation was prepared by mixing 40 wt % Pt on carbon black (HiSpec™ 4000 Pt/C catalyst powder, Johnson Matthey Plc, London, UK) first with dimethylacetamide (DMAc), then with Nafion™ ion exchange resin (D2021 20 wt % ionomer in alcohol/water, DuPont, Wilmington, Del., USA), previously dried and resuspended in DMAc, with intermittent stirring and sonication, and then adding the electrospinning polymer solution comprising polyvinylidene fluoride (PVDF, Kynar 761, Arkema) in DMAc. After all components had been added, the ink was mixed for 24 hours. The amounts of the respective components added were chosen such that the resulting ink formulation had a weight ratio of Pt/C:Nafion™:PVDF of 40:30:30, and the total combined content of polymer and catalyst was 17.0 wt % with respect to the total weight of the ink formulation.

Electrospinning was performed as for Example 1, except that the nominal electric field was increased to 60 kV.

Figure 2:
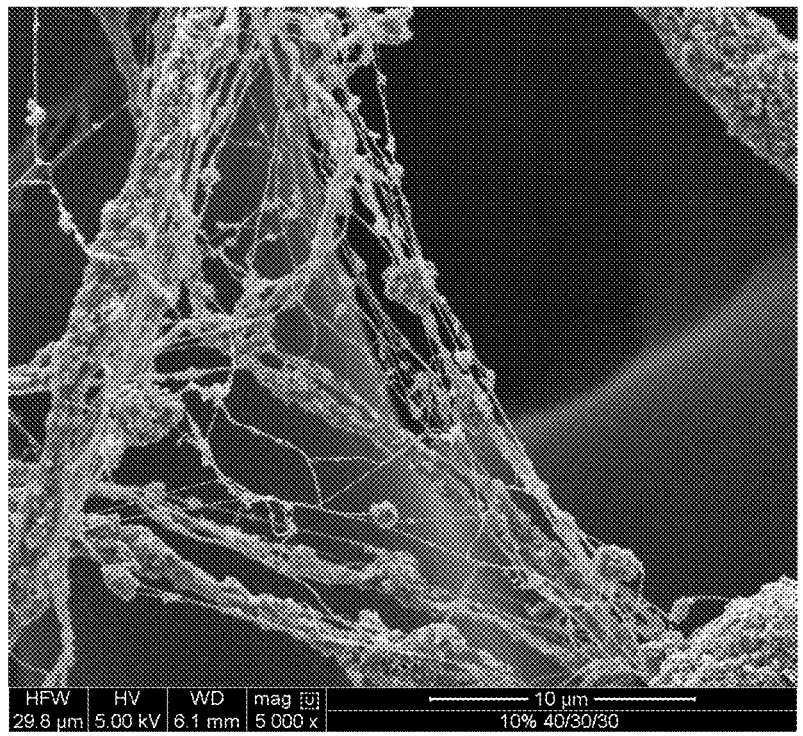
FIG. 2 shows a scanning electron microscope (SEM) image of the electrospun fibrous mat of Example 2.

Contrary to experiments with poly(acrylic acid) ("PAA") as electrospinning polymer, in case of PVDF as electrospinning polymer the higher combined content of polymer and catalyst did not lead to any problems with burning fibers. Quite surprisingly the higher combined content of polymer and catalyst resulted in an electrospun mat structure (see FIG. 2 for a SEM picture) that more closely resembled the PAA-based electrospun fibers previously demonstrated.

Example 3

An electrospinning ink formulation was prepared by mixing 40 wt % Pt on carbon black (HiSpec™ 4000 Pt/C catalyst powder, Johnson Matthey Plc, London, UK) first with dimethylformamide (DMF), then with Nafion™ ion exchange resin (D2021 20 wt % ionomer in alcohol/water, DuPont, Wilmington, Del., USA), previously dried and resuspended in DMF, with intermittent stirring and sonication, and then adding the electrospinning polymer solution comprising polyvinylidene fluoride (PVDF, Kynar 761, Arkema) in DMF, followed by the addition of acetone to increase the solvent evaporation rate. After all components had been added, the ink was mixed for 24 hours. The amounts of the respective components added were chosen such that the resulting ink formulation had a weight ratio of Pt/C:Nafion™:PVDF of 40:10:50, and the weight ratio of DMF:acetone was 90:10. Total combined content of polymer and catalyst was 13.3 wt % relative to the total weight of the formulation.

A hydrophobized carbon paper gas diffusion layer with a microporous coating (Sigracet 25BC with an average thickness of 235 μm and an average area weight of 86 g/m$^2$, SGL Group, Wiesbaden, Germany) was cut to 5 cm$^2$ and mounted onto a smooth nonwoven substrate (part number #HOP-60HCF, Hirose Paper Manufacturing Co., Ltd, Tosa-City, Kochi, Japan).

Figure 3:
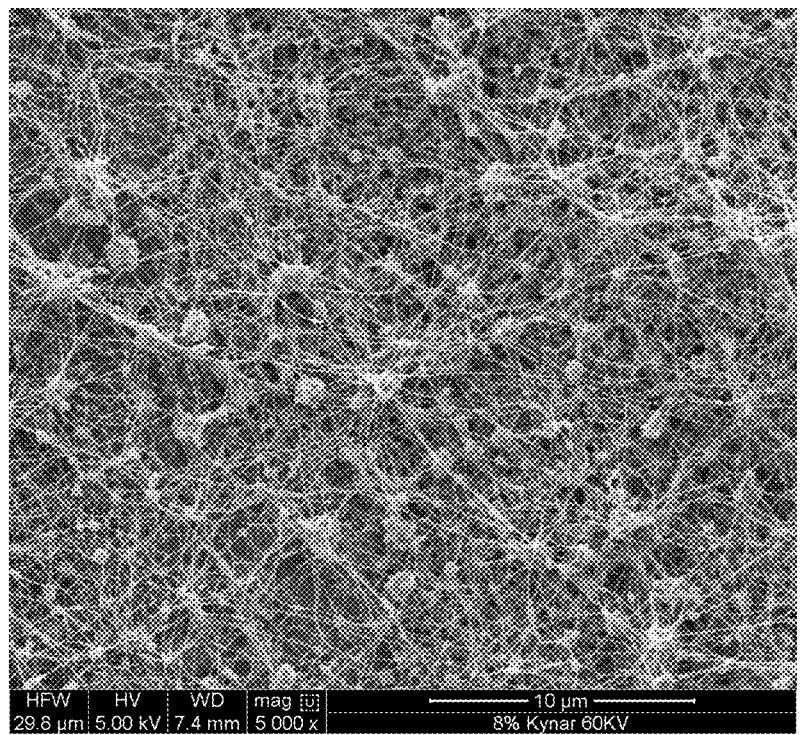
FIG. 3 shows a scanning electron microscope (SEM) image of the electrospun fibrous mat of Example 3.

Electrospinning was performed as described for Example 2. An SEM picture of the resulting electrospun mat is depicted in FIG. 3. It shows a structure with clusters of Pt/C connected with small "decorated" fibers.

Example 4

The electrospun mats obtained in Example 3 were used as electrospun nanofiber electrodes in a membrane electrode assembly (MEA). The electrospun mats were hot-pressed on either side of a membrane (Nafion™ 211, DuPont, Wilmington, Del., USA) at 140° C. using a Carver bench top hydraulic press (No. 3912, Carver Inc., Wabash, Ind., USA).

Pt loading was calculated at 0.138 mg Pt·cm$^{-2}$ for the cathode and 0.093 mg Pt·cm$^{-2}$ for the anode.

Figure 5:
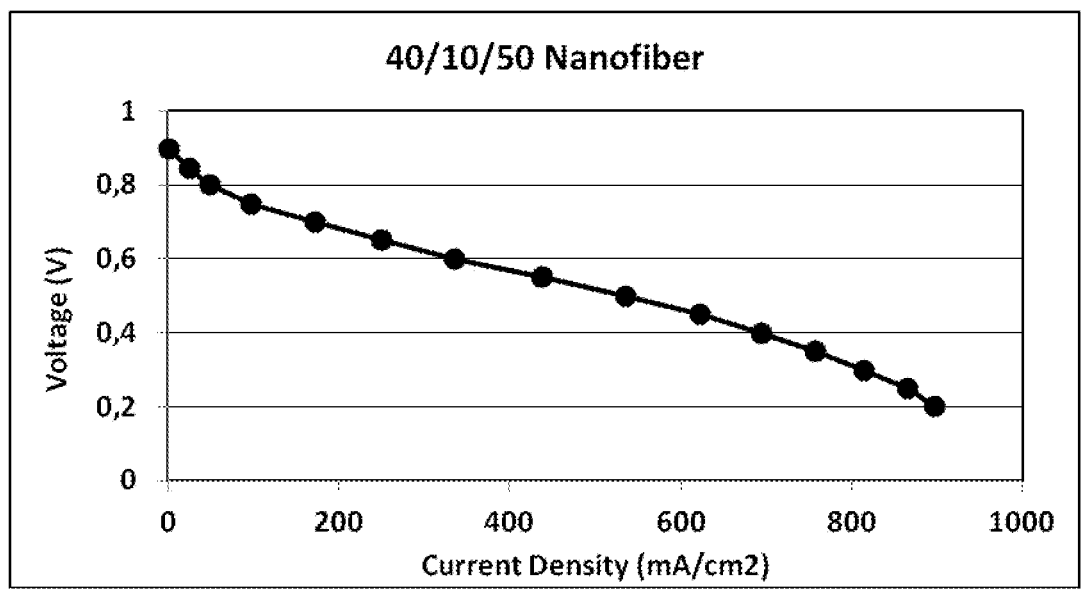
FIG. 5 shows the performance data of the membrane electrode assembly of Example 4.

MEA performance data was collected in a hydrogen/air fuel cell at 80° C. and 100% relative humidity without any backpressure and is shown in FIG. 5. As can be seen the present MEA delivers about 250 mA·cm$^{-2}$ at 0.65 V, with a maximum power density of around 280 mW·cm$^{-2}$.

Surprisingly, despite the introduction of PVDF, which is a hydrophobic polymer, into the catalyst (i.e. Pt comprising) layer a working fuel cell could be obtained that—without further optimization—achieved good performance while at the same time allowing improved and safer production of the electrospun mat.

Without wishing to be bound by theory it is believed that the lower performance in the activity region of the polarization curve (see FIG. 4) may be due to the low content of Nafion™ and that performance can be improved by optimization of the composition of the MEA.

Example 5

An electrospinning ink formulation was prepared as described for Example 3, except that the resulting ink formulation had a weight ratio of Pt/C:Nafion™:PVDF of 40:36:24, and the weight ratio of DMF:acetone was 70:30. Total combined content of polymer and catalyst was 13.3 wt % relative to the total weight of the formulation.

Electrospinning was performed as described for Example 2, resulting in "decorated" fibers, unfortunately in insufficient quantity for manufacturing of a MEA.

Example 6

An electrospinning ink formulation was prepared as described for Example 3, except that the resulting ink formulation had a weight ratio of Pt/C:Nafion™:PVDF of 50:17:33. Total combined content of polymer and catalyst was 10 wt % relative to the total weight of the formulation.

Figure 4:
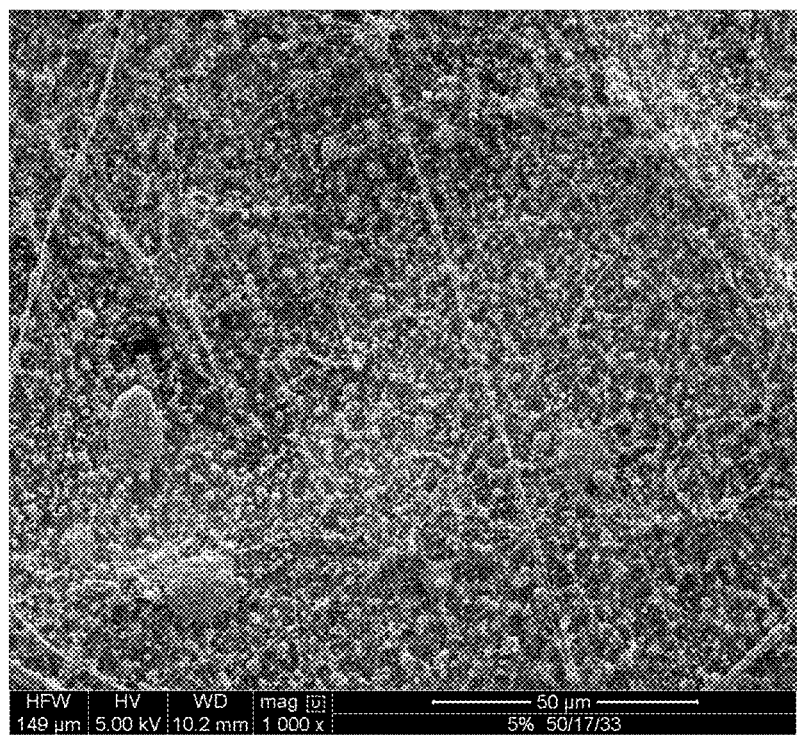
FIG. 4 shows a scanning electron microscope (SEM) image of the electrospun fibrous mat of Example 6.

Electrospinning was performed as described for Example 2, resulting in the electrospun mat shown in FIG. 4.

Example 7

The electrospun mats obtained in Example 6 were used as electrospun nanofiber electrodes in a membrane electrode assembly (MEA). The electrospun mats were hot-pressed on either side of a membrane (Nafion™ 211, DuPont, Wilmington, Del., USA) at 140° C. using a Carver bench top hydraulic press (No. 3912, Carver Inc., Wabash, Ind., USA).

Pt loading was calculated at 0.138 mg Pt·cm$^{-2}$ for the cathode and 0.093 mg Pt·cm$^{-2}$ for the anode.

Figure 6:
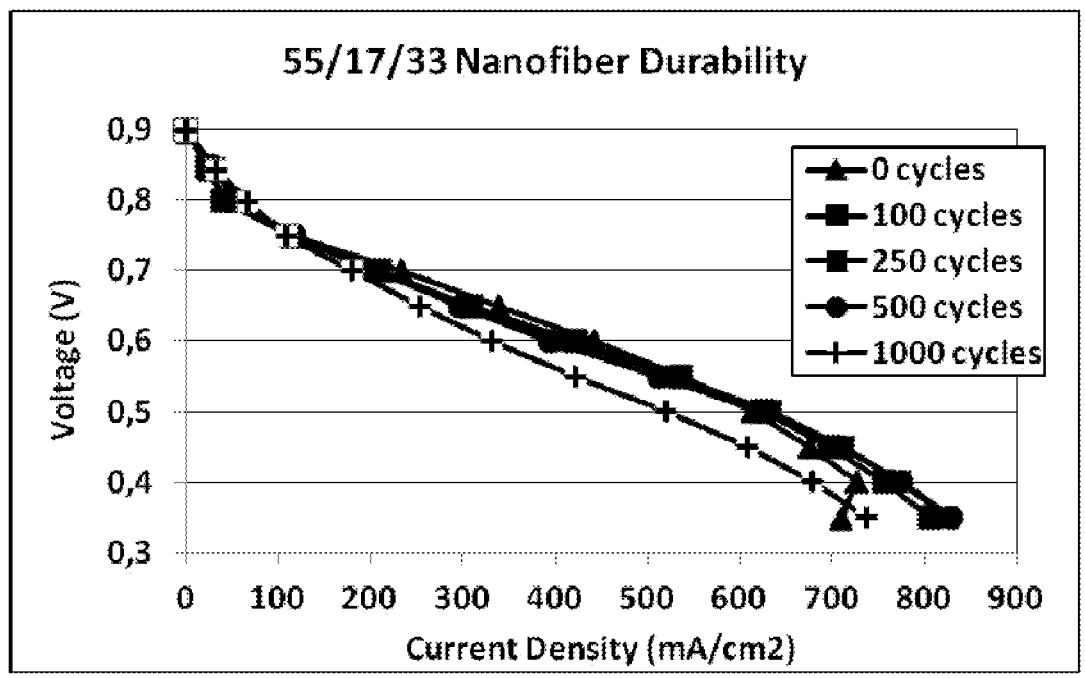
FIG. 6 shows the performance data of the membrane electrode assembly of Example 7.

MEA performance data was collected in a hydrogen/air fuel cell at 80° C. and 100% relative humidity without any backpressure and is shown in FIG. 6 (see curve at 0 cycles). As can be seen the present MEA delivers about 250 mA·cm$^{-2}$ at 0.65 V, with a maximum power density of around 410 mW·cm$^{-2}$.

Carbon corrosion durability data was generated using the FCCJ protocol of voltage cycling from 1.0 V to 1.5 V at a scan rate of 0.5 V·s$^{-1}$ under hydrogen and nitrogen. After 0, 100, 250, 500 and 1000 corrosion cycles fuel cell polarization data, shown in FIG. 6, was recorded. Following the corrosion procedure, the power density had decreased from 306 mW·cm$^{-2}$ to 273 mW·cm$^{-2}$, an 11% decrease, and the current density at 0.65 V decreased from 340 mW·cm$^{-2}$ to 253 mW·cm$^{-2}$, a 26% decrease. By comparison, a comparable MEA with poly(acrylic acid) instead of PVDF showed a loss of 16% for the power density and of 59% for the current density at 0.65 V.

The present results clearly show a significant improvement in durability for the present MEA as compared to a conventional MEA with PAA. These results are particularly surprising in view of the fact that at the same time the present MEA in accordance with the present invention showed good power generation performance.

Example 8 (Comparative)

An electrospinning ink formulation was prepared as described for Example 1, except that the resulting ink formulation had a weight ratio of Pt/C:Nafion™:PVDF of 55:30:15, and the total combined content of polymer and catalyst was 10 wt % with respect to the total weight of the ink formulation.

The ink formulation was painted onto hydrophobized carbon paper gas diffusion layer with a microporous coating (Sigracet 25BC with an average thickness of 235 μm and an average area weight of 86 g/m$^2$, SGL Group, Wiesbaden, Germany), cut to 5 cm$^2$.

A membrane electrode assembly (MEA) was prepared in analogy to Example 4. Pt loading was calculated at 0.145 mg Pt·cm$^{-2}$ for the cathode.

Figure 7:
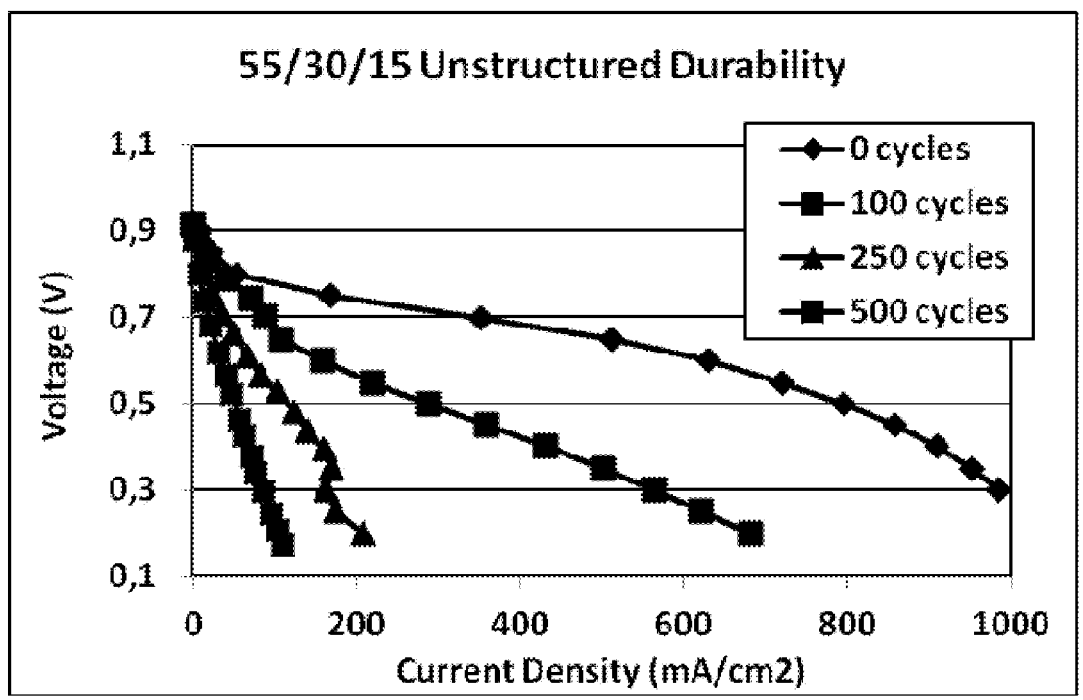
FIG. 7 shows polarization data of the hydrogen/air fuel cell of Example 8 after 0, 100, 250 and 500 cycles.

Carbon corrosion durability data was generated as described in Example 7. The respective fuel cell polarization data after 0, 100, 250, and 500 cycles is shown in FIG. 7. After only 500 cycles the peak power density decreased from about 400 mW·cm$^{-2}$ to about 30 mW·cm$^{-2}$, and only 4% of the original current density at 0.65 V was retained.

By contrast, after 500 cycles the MEA of Example 7, which comprised PVDF, retained 88% of its original current density, and peak power density even slightly increased from 306 mW·cm$^{-2}$ to 318 mW·cm$^{-2}$.

These results show that electrospun mats in accordance with the present invention compare very favorably to a conventional coating with regards to durability of the MEA, while at the same time giving good current and power densities.

Example 9

Electrospinning ink formulations were prepared by mixing 40 wt % Pt on carbon black (HiSpec™ 4000 Pt/C catalyst powder, Johnson Matthey Plc, London, UK) first with different combinations of electrospinning polymer and solvent as listed in Table I below to yield respective ink formulations with 2.5 wt % electrospinning polymer, 8 wt % Pt/C and 88.5 wt % solvent, with wt % relative to the total weight of the ink formulation. The ink formulations were mixed by magnetic stirring and sonication.

TABLE I

| Reference | Electrospinning polymer | Solvent |
|---|---|---|
| A | PVP | Water |
| B | PVP | DMF |
| C | PVDF | DMAc |
| D | Nylon 6 (B24) | TFE |
| E | PVA | Water |

Figure 8:
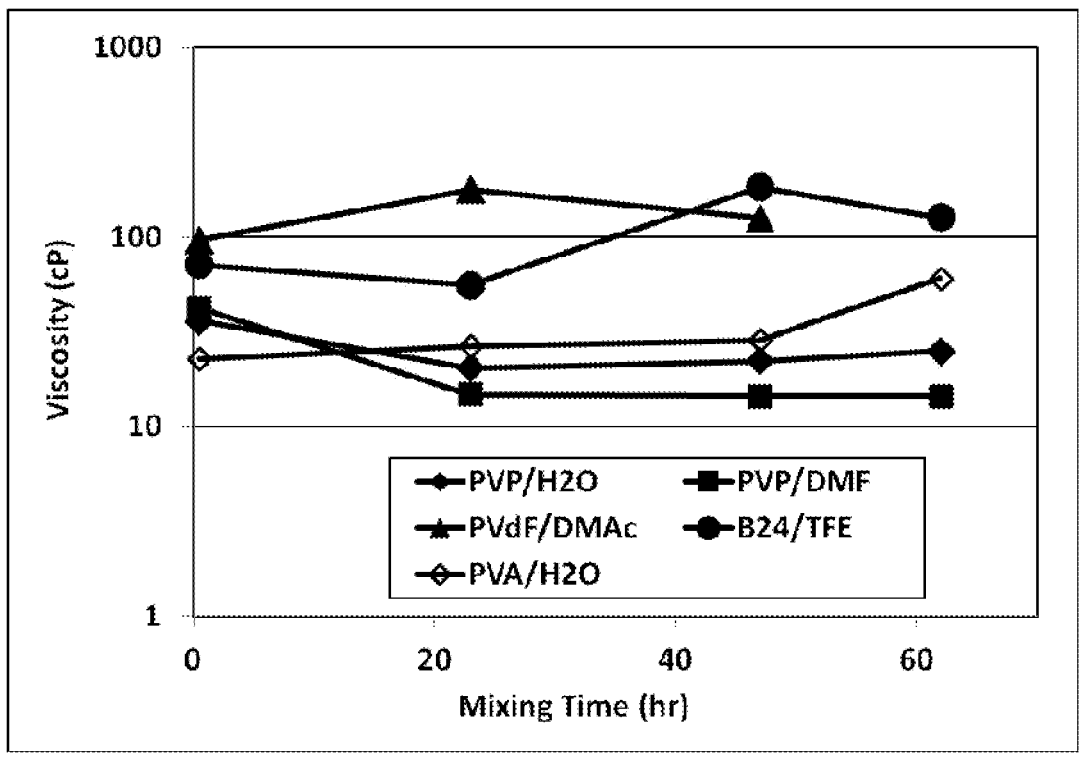
FIG. 8 shows the viscosities of the ink formulations of Example 9 after 0.5, 23, 47 and 62 hours after initial mixing.

Viscosities of the ink formulations were measured after 0.5, 23, 47 and 62 hours after the initial mixing of continuous magnetic stirring with results being shown in FIG. 8.

As can be seen a significant decrease in viscosity was found for PVP, both in water and DMF. Without wishing to be bound by theory it is possible that this decrease might be due to a change in the structure of PVP during mixing with Pt/C. This leads to the conclusion that PVP might not be as suitable for use in an electrospinning ink formulation comprising Pt/C. Because the respective ink formulations comprising PVDF, Nylon B24 and PVA rather increased in viscosity, these seem—without wishing to be bound by theory—suitable for use in an electrospinning ink formulation.

Example 10

Solvent oxidation was evaluated by headspace GC-MS. Ink formulations were prepared by mixing 40 wt % Pt on carbon black (HiSpec™ 4000 Pt/C catalyst powder, Johnson Matthey Plc, London, UK) first with water (Mill-Q, Type 1 ulta-pure water according to ISO 3696), then with a further solvent. No further solvent was added for the control sample. The resulting ink formulations were then sonicated for nine hours. Samples were diluted and then submitted to GC-MS (purge and trap).

The control sample as well as the ink formulation comprising dimethylformamide (DMF) were diluted by a factor of 1000 with said Type 1 ultrapure water. The ink formulations comprising acetone, 1-propanol, trifluoroethanol (TFE) and dimethylacetamide (DMAc) were diluted by a factor of 100,000 and the ink formulation comprising hexafluoroisopropanol (HFIP) by a factor of 200,000 with said Type 1 ultrapure water.

No significant difference could be found between the control and the other ink formulations, thus indicating that the ink formulations comprising the tested solvents are not prone to oxidative degradation.

In summary the present examples show that the use of an oxidatively stable solvent, such as for example DMF, in combination with a degradation resistant polymer, such as for example PVDF, allowed obtaining a stable catalyst electrospinning ink formulation. The present examples further show that the present electrospinning ink formulation allows for simultaneous optimization of fiber formation and fuel cell performance. Very surprisingly it has been found that the present ink formulations allow also for improving durability of the so-produced fuel cells.

The invention claimed is:

1. An electrospun fibrous mat comprising
  (i) metal supported on a carrier,
  (ii) an ionomer, and
  (iii) an electrospinning polymer selected from the group of halogen-comprising polymers.

2. The electrospun fibrous mat according to claim 1, wherein the metal is selected from the group consisting of Sc, Y, Ti, Zr, Hf, V, Nb, Ta, Cr, Mo, W, Fe, Ru, Os, Co, Rh, Jr, Ni, Pd, Pt, Cu, Ag, Au, Zn, Cd, Hg, lanthanides, actinides and blends thereof.

3. The electrospun fibrous mat according to claim 1, wherein the carrier is selected from the group consisting of carbon, silica, metal oxides, metal halides and blends thereof.

4. The electrospun fibrous mat according to claim 1, wherein the ionomer comprises electrically neutral repeating units and ionized or ionizable repeating units.

5. The electrospun fibrous mat according to claim 1, wherein the halogen-comprising polymer comprises fluorine, chlorine or both, fluorine and chlorine.

6. The electrospun fibrous mat according to claim 1, wherein the halogen-comprising polymer comprises an alkanediyl monomer unit of formula (III)

wherein
P is 1, 2, 3 or 4;
q is 0, 1, 2 or 3;
r is 0, 1, 2 or 3;
$Y^1$ is fluorine;
$Y^2$ is chlorine; and
$Y_3$ is, at each occurrence independently of the other, selected from the group consisting of alkyl having from 1 to 20 carbon atoms, halogenated alkyl having from 1 to 20 carbons atoms, alkoxy having from 1 to 20 carbon atoms and halogenated alkoxy having from 1 to 20 carbon atoms, and the respective alkyl and alkoxy wherein one or more carbon atoms are replaced by a heteroatom, which is selected from the group consisting of —O—, —S—, —SE—, —N($R^{18}$)—, =N—, —P($R^{18}$)—, —Si($R^{18}$)($R^{19}$)—, and —Ge($R^{18}$)($R^{19}$)— with $R^{18}$ and $R^{19}$ being independently of one another alkyl or halogenated alkyl having from 1 to 20 carbon atoms or cycloalkyl or halogenated cycloalkyl having from 3 to 20 carbon atoms, with the provision that p+q+r≤4.

7. The electrospun fibrous mat according to claim 1, wherein the ratio of the metal with carrier, the ionomer and the electrospinning polymer is in a ratio of A:B:C with A being at least 10 parts and at most 80 parts, B being at least 1 part and at most 40 parts and C being at most 60 parts, with the sum of A, B and C being 100 parts, with parts being given as weight parts.

8. A membrane electrode assembly comprising the electrospun fibrous mat of claim 1.

9. A fuel cell comprising the membrane electrode assembly of claim 8.

10. The electrospun fibrous mat according to claim 1, which is in a single layer, which layer contains the (i) metal supported on a carrier, (ii) the ionomer, and (iii) the electrospinning polymer selected from the group of halogen-comprising polymers.

11. The electrospun fibrous mat according to claim 1, wherein the (i) metal supported on a carrier, (ii) the ionomer, and (iii) the electrospinning polymer selected from the group of halogen-comprising polymers have been mixed together to form a mixed together composition.

12. A composite comprising
  the electrospun fibrous mat according to claim 1, and
  a porous single or multilayered substrate or support.

13. A process for preparing an electrospun fibrous mat according to claim 1, comprising the steps of
  (a) providing to an electrospinning apparatus an ink formulation comprising
    (i) metal supported on a carrier,
    (ii) an ionomer,
    (iii) an electrospinning polymer selected from the group of halogen-comprising polymers, and
    (iv) a solvent, and
  (b) subsequently electrospinning the ink formulation to obtain the electrospun fibrous mat.

14. The process according to claim 13, wherein step (b) is performed by nozzle-free electrospinning.

15. The process according to claim 13, wherein the electrospinning apparatus comprises two electrodes, the distance between which is at least 0.01 m and at most 2 m.

16. An electrospun fibrous mat having been prepared by a process comprising the steps of
  (a) providing to an electrospinning apparatus an ink formulation comprising
    (i) metal supported on a carrier,
    (ii) an ionomer,
    (iii) an electrospinning polymer selected from the group of halogen-comprising polymers, and
    (iv) a solvent, and
  (b) subsequently electrospinning the ink formulation to obtain the electrospun fibrous mat.

17. The electrospun fibrous mat according to claim 16, wherein the ink formulation comprises at least 1 wt % and at most 30 wt % of combined amounts of metal with carrier, ionomer and electrospinning polymer, with wt % relative to the total weight of the ink formulation.

18. The electrospun fibrous mat according to claim 16, wherein the solvent is selected from the group consisting of water and organic solvents.

19. The electrospun fibrous mat according to claim 16, wherein the solvent is selected from the group consisting of water, ethers of formula $R^{13}$—O—$R^{14}$, alcohols of formula $R^{15}$—OH, ketones of formula $R^{16}$—C(=O)—$R^{17}$, amides of formula $(R^{16})_2$N—C(=O)—$R^{17}$ and blends thereof, wherein $R^{13}$, $R^{14}$, $R^{15}$, and $R^{16}$ are independently of each other selected from the group consisting of alkyl having from 1 to 10 carbon atoms and fluorinated alkyl having from 1 to 10 carbon atoms, and $R^{17}$ is selected from the group consisting of H, alkyl having from 1 to 10 carbon atoms and fluorinated alkyl having from 1 to 10 carbon atoms, or $R^{13}$ and $R^{14}$ may together be selected from the group consisting of alkanediyl having from 4 to 6 carbon atoms and fluorinated alkanediyl having from 3 to 6 carbon atoms, or $R^{16}$ and $R^{17}$ may together be selected from the group consisting of alkanediyl having from 4 to 6 carbon atoms and from fluorinated alkanediyl having from 4 to 6 carbon atoms.

* * * * *